Jan. 15, 1952     J. D. ARROWSMITH     2,582,472
FLOWER SNIPS
Filed Aug. 22, 1947     2 SHEETS—SHEET 1
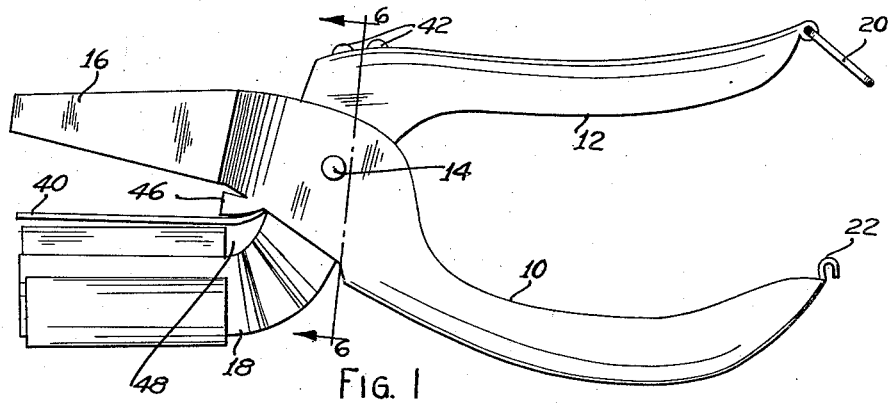
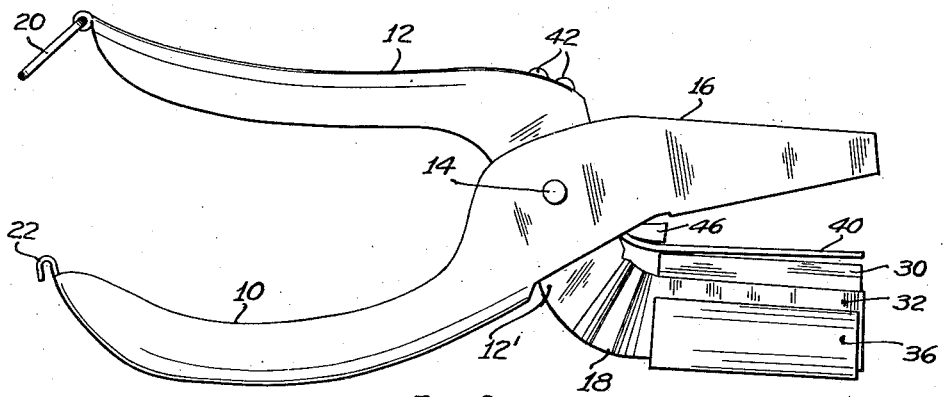
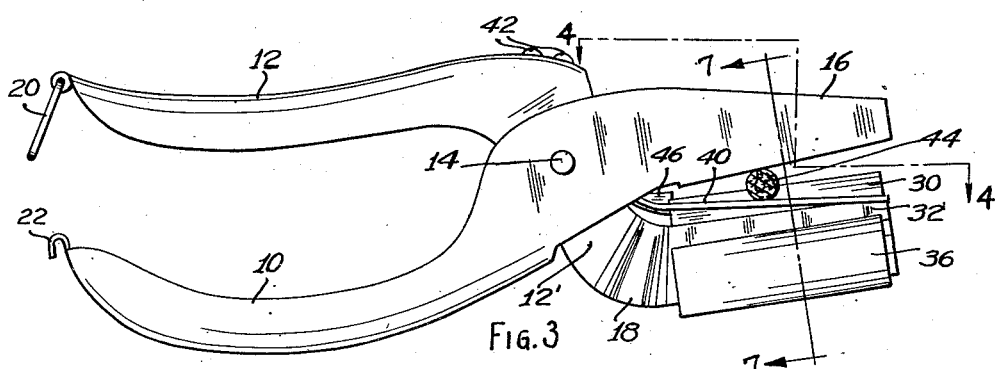
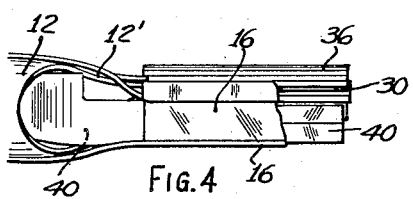
Inventor
JOHN D. ARROWSMITH
By Reynolds & Beach
Attorneys Jan. 15, 1952  J. D. ARROWSMITH  2,582,472
FLOWER SNIPS
Filed Aug. 22, 1947  2 SHEETS—SHEET 2
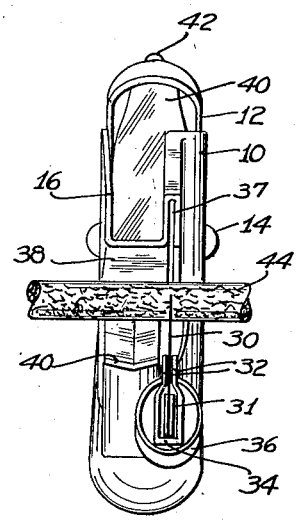
FIG. 5
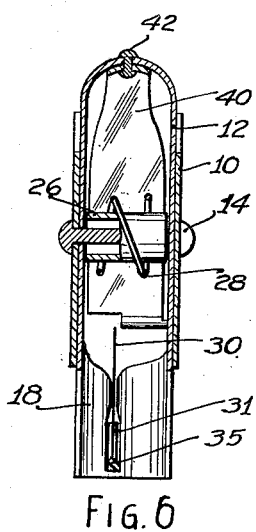
FIG. 6
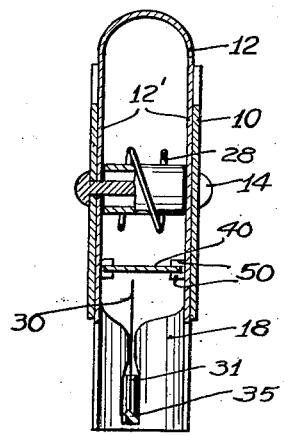
FIG. 10
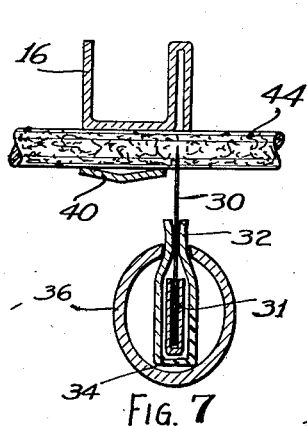
FIG. 7
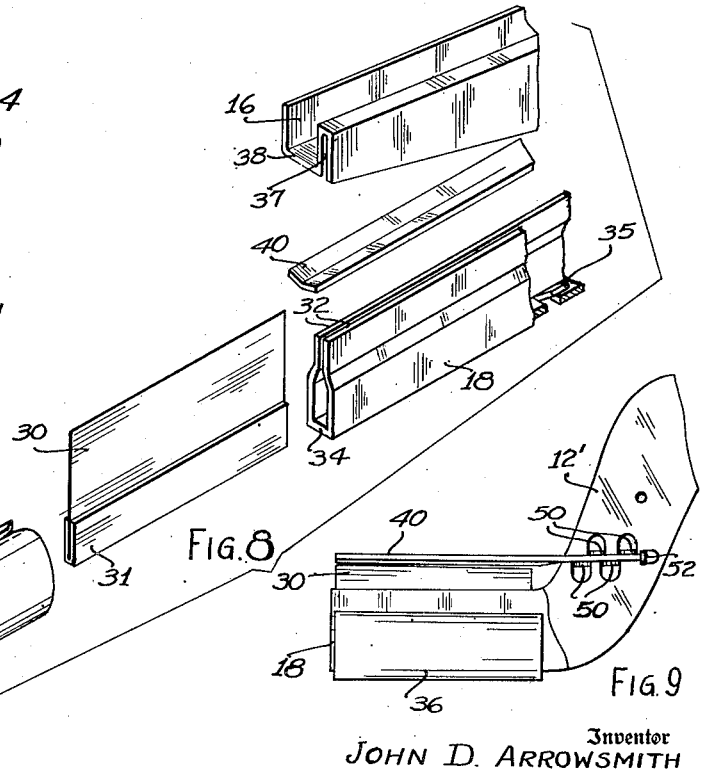
Inventor
JOHN D. ARROWSMITH
By Reynolds & Beach
Attorneys Patented Jan. 15, 1952

2,582,472

UNITED STATES PATENT OFFICE 2,582,472

FLOWER SNIPS

John D. Arrowsmith, Richmond Beach, Wash.

Application August 22, 1947, Serial No. 770,054

2 Claims. (Cl. 30—135)

This invention relates to a handy device comprising snips for cutting the stems or stalks of flowers or fruit, plants or bushes, particularly in gathering such flowers or fruit. The principal object of the invention is to provide improved cutting snips by the use of which flowers, for example, may be gathered by one hand, leaving the other hand free to hold a basket or other container.

Another object is to provide an improved implement of this type which incorporates means for holding the outer stem portion of a plant firmly, but without injuring or crushing it, prior to, during and after cutting, and which also incorporates a thin detachable blade cooperable with the holding means and capable of cleanly slicing the plant's stem or stalk with the least cutting effort, and such that dull blades may readily be replaced by new or sharpened blades.

An advantage of my snips is their light weight, coupled with considerable strength, and their design contributing to ease of manufacturing them quickly and economically by punch press mechanism.

Other objects and the various features and advantages of the invention will become apparent from a consideration of the following description based on the accompanying drawings.

Figure 1 is a side elevation view of snips representing a preferred embodiment of the invention, and Figure 2 is a side elevation view from the opposite side. Figure 3 is a side elevation view of the snips, taken from the same aspect as Figure 2, showing the snips in use.

Figure 4 is a fragmentary partial sectional view showing the forward or jaw end of the snips, the view being taken along line 4—4 of Figure 3.

Figure 5 is an end view of the snips in operation as in Figure 2, seen from the cutting end thereof.

Figure 6 is a transverse sectional view taken along the line 6—6 of Figure 1.

Figure 7 is a sectional detail view taken along the line 7—7 of Figure 3, illustrating the cutting and clamping or holding means of the snips.

Figure 8 is a fragmentary exploded view in perspective showing the jaw parts of the cutters.

Figure 9 is a fragmentary side elevation view of a modified type of holding mechanism for snips, and Figure 10 is a transverse sectional view of the same, corresponding to the view of Figure 6 of the first embodiment.

Preferably, the snips are sturdy and light, and to this end, may be formed of a light gauge sheet metal. They comprise handle members 10 and 12 of convenient shape, pivoted together about pin 14 and having the respective jaw extensions 16 and 18 between which the cutting and clamping actions take place. For ease in handling, one of the handles is bowed inwardly and the other bowed outwardly, the outwardly-bowed handle being the one which normally would rest in the palm of the hand and the other handle in the crook of the fingers. For strength, the handles are formed as channels with the flanges directed inwardly. At the ends of the handles suitable latch means is provided, such as a metal loop 20 mounted on one handle and a hook 22 on the other, which may be interengaged to hold the handles together for maintaining the jaws closed when the device is not in use.

The securing pin or bolt 14, about which pivot the handles and jaws, extends through both flanges of both channel members and is surrounded by a spacer sleeve 26 extending between the walls of the inner channel. This sleeve supports the thin side walls of the handle members at their central portions when the webs of the channel sections are cut out to enable the jaws to be formed and the channel members to cross. Such support of the walls enables a tight riveted or bolted pivot joint to be made, while acting as a support for a coil spring 28 encircling the sleeve and having free ends which extend into the hollow portions of the handles. These ends bear against the inner sides of the handle member, normally to urge the handles apart to open the jaws.

One of the jaw members, that numbered 18 in the drawings, carries a readily detachable blade 30, such as a single-edged reinforced safety razor blade, inserted between a pair of parallel clamping strips 32 formed by the jaw. This construction is shown best in Figs. 1, 5, 7, and 8. The strips are joined together or backed by the web 34 forming the outer edge of the jaw member 18, the channel defined by the strips and web constituting a blade receptacle or cavity open at its end and along the inner face of the jaw. The cavity may, as shown, be wider in its bottom portion to accommodate the reinforcing channel 31 of a reinforced blade such as blade 30. Inward movement of such blade may be limited by abutment of the inner end of the blade back 31 against a small tab 35 pressed inward from the web 34 of the blade socket. The strips 32, normally spaced apart to allow the insertion of a blade freely between them, are clamped together tightly against the opposite faces of the blade by a spring clamp 36 which slips over the ends of the jaw members 18 carrying the blade. The adjacent edges of the clamp are relieved or flared somewhat at one end to form an entering notch or slot wide enough to receive the ends of the strips 32. As the clamp is slid endwise toward the handle, the strip ends will wedge apart the clamping jaws, but the clamp, being formed of springy sheet metal material, will press the strips firmly against the blade, the clamp edges separating only sufficiently to accommodate between them the strips 32 and blade body 30 pressed tightly together.

When the blade 30 is positioned and clamped between strips 32, its cutting edge portion protruding laterally beyond the edges of the blade socket flanges 32 is then receivable, during cutting action of the snips, in an elongated, narrow and relatively deep groove 37 formed in the opposing jaw member 16. The groove is preferably only slightly wider than the thickness of the blade, and if desired the blade may be located to enter the groove eccentrically, even to slide along one groove wall in cutting. In the construction indicated, the groove 37 is formed by a reverse or reentrant fold in the sheet forming the jaw member and integral with the handle.

The groove 37 is located near one edge of the jaw member 16, leaving a wide and relatively flat jaw face 38 between the inner edge of the groove and the other edge of the jaw member. Against this flat face of jaw member 16 the stem or stalk of a plant is held by or clamped lightly but firmly by an elongated tongue-like spring member 40 extending alongside the blade throughout its length and mounted on the blade-carrying handle and jaw element for moving with it during opening and closing of the jaws. Preferably the jaw 16 is offset somewhat from the handle, as shown best in Fig. 4, to dispose the blade-receiving groove 37 more nearly centrally between the sides of the cutters, while still making the flat face 38 of substantial width.

When clamped between the spring member 40 and the jaw 16, the stem of a cut flower or fruit will be held as long as the jaws are kept closed after the cutting action has been completed. At will the flower or fruit may be dropped from the snips into a container or basket simply by releasing the handles to enable them to be moved apart and the jaws opened by the spring 28 encircling the pivot pin 14.

The clamping spring member 40 is mounted by its inner end, being anchored to the blade-carrying jaw and handle member 18, and passing near the pivot axis of the device. Conveniently this spring end may be offset adjacent to pivot 14 from its stem-gripping end, and secured internally to the back of the handle member 12 near its root end by rivets 42. From such anchor point the spring conforms generally to the contour of the handle member, extending outwardly through the hollow of the member 12—18 between its side plates 12' at the general location of the pivot and from the throat of the device into the space between the jaws. The outer or operative portion of the spring member normally lies in generally parallel relation to and alongside the cutting edge of the blade 30, and preferably precedes the blade in contacting the work during closing of the jaws.

Of particular note is the formation of that portion of the spring 40 between the jaws in a fashion to facilitate gripping of the stem or stalk of a plant. For such purpose the spring member 40 is formed of concave cross section facing jaw 16 to provide sharp gripping ridges along opposite edges of the spring which bite into the stalk or stem being cut. Since the sharp edges of the trough-shaped spring contact the stem at locations spaced some distance apart along its length, the stem may be held easily without slipping or breaking. Moreover, during closing of the jaws, inasmuch as the spring member 40 preferably precedes movement of the cutting edge of blade 30 toward the stem, or at least follows the blade's cutting edge sufficiently closely so that it grips the stem firmly before the blade has cut into it deep enough to weaken its natural support appreciably, the stem is thereby securely held in proper cutting position during, as well as after, the cutting operation of the blade. In Figures 3 and 5 of the device is shown in action, cutting a plant stem 44.

As already indicated, important features of the invention also reside in the use of a detachable blade and the manner of mounting and supporting the same. Not only is the blade held securely between the strips 32, but it is supported by them to improve the supported rigidity of the blade against deflection laterally during cutting, thus decreasing the possibility of blade breakage. Moreover, the narrow slot 37 serves both to protect the blade and the fingers of a person handling the device while the jaws are closed and the device is not in use, and also aids the blade in making a clean cut by supporting the plant fibers at opposite sides of the blade close to the cutting plane, to resist bending of the stem as the blade penetrates it. This action is shown best in Fig. 7.

As a further feature of the snips the straight line defined by the blade's cutting edge, instead of intersecting the jaw pivot axis (14), with which it is in right angle relationship, is appreciably offset therefrom in the plane of swing of the blade and in the direction away from jaw 16 opposing the blade, as seen in Figure 3, for example. The jaw 18 carrying the blade, and the corresponding handle 12 are interconnected by the generally transverse leg 12'. The offset mentioned above is the result of the appreciable length of the leg 12' between the pivot pin 14 and the root of the jaw 18. This offset gives the blade a longitudinal component of movement during its swinging, resulting in a slicing action tending to roll the stem as it is engaged by the blade and facilitating cutting.

The device also includes a tab or ear 46, shown in Figs. 2 and 3, which enters the space between the jaws at their base to form a stop for a plant stem, preventing it from pressing the inner end of the blade 30 and dropping into the space 48 at the base of the jaws beyond the blade as the stem is inserted between them.

An alternative arrangement for mounting the stem-clamping spring member 40 is shown in Figures 9 and 10, in which the gripping portion of the spring member between the jaws 16 and 18 is constructed as before, but instead of the enclosed end being riveted to one of the handles at its base, each of the two opposite sides of leg 12' extending between handle 12 and jaw member 18 is perforated and the cut metal bent inwardly to form two parallel rows of tabs 50 spaced apart to receive snugly between them the spring member. Also, at the inner end of such rows, a stop tab 52 is pressed up against which the end of such spring member abuts, when inserted. Otherwise, the snips may be the same as in the embodiment first described.

I claim as my invention:

1. Cutting snips comprising a pair of handle members having jaw extensions thereon and pivoted together at the roots of said jaw extensions, said handle members and jaw extensions being formed of sheet metal, the jaw extension of one handle member comprising parallel sheet metal sides interconnected by a transverse flat sheet metal web comprising the jaw face, the sheet metal of one of said sides, at its edge opposite said web, extending first transversely outward from said side a short distance, thence closely parallel to said side to the plane of web to define a narrow blade-receiving groove along said side, the other jaw extension comprising parallel sheet metal sides adapted to be pressed together against opposite faces of a razor blade clamped therebetween and support said blade for swinging into and out of said groove in a plane perpendicular to said web, and a resilient metal clamping strip carried by one of the handle members and projecting into the space between jaws for swinging of such strip against said jaw face to clamp an object against the same as the jaws are closed for cutting.

2. The cutting snips defined in claim 1, wherein the plane of the web of the first jaw extension is spaced appreciably from the pivot axis on the side thereof toward the other jaw extension, and the blade held by the second jaw extension has a cutting edge which is substantially parallel to the plane of such web when the blade is swung into cutting position at the entrance of the groove.

JOHN D. ARROWSMITH.

REFERENCES CITED

The following references are of record in the file of this patent:

UNITED STATES PATENTS

| Number | Name | Date |
|---|---|---|
| 1,055,910 | Hoover | Mar. 11, 1913 |
| 1,648,618 | McGourty | Nov. 8, 1927 |
| 2,064,105 | Conlee | Dec. 15, 1936 |
| 2,195,353 | Atchison | Mar. 26, 1940 |